G. ZAHRAJIAN.
PRESSURE GAGE.
APPLICATION FILED JULY 18, 1917.
1,271,410.
Patented July 2, 1918.
2 SHEETS—SHEET 1.
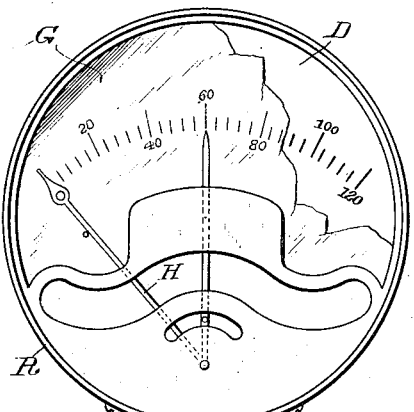
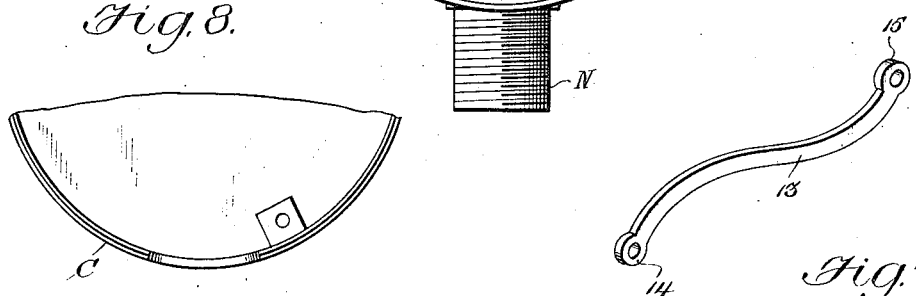
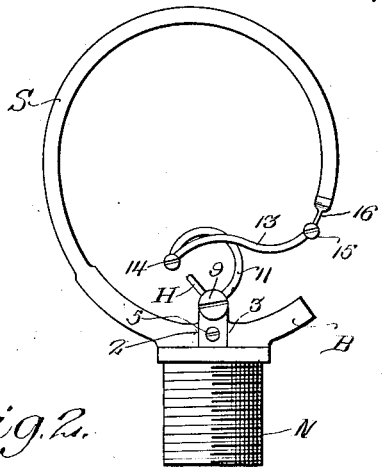
WITNESSES
J. H. Crawford
N. L. Coslamer
INVENTOR
Choogas Zahrajian,
BY Victor J. Evans
ATTORNEY G. ZAHRAJIAN.
PRESSURE GAGE.
APPLICATION FILED JULY 18, 1917.
1,271,410.
Patented July 2, 1918.
2 SHEETS—SHEET 2.
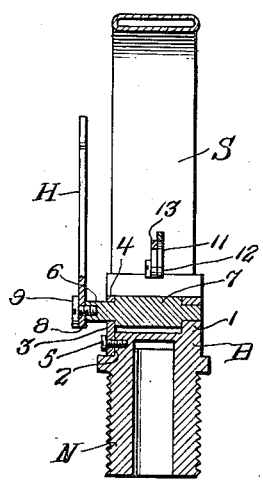
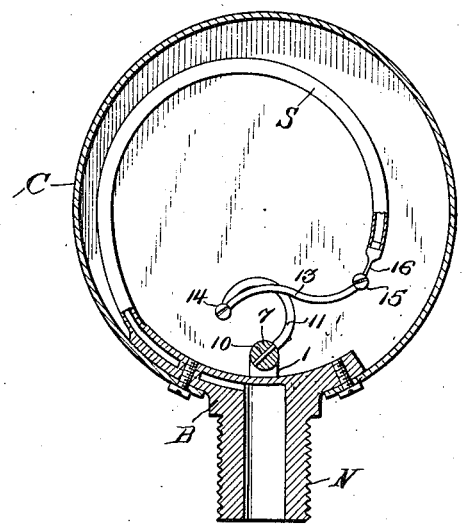
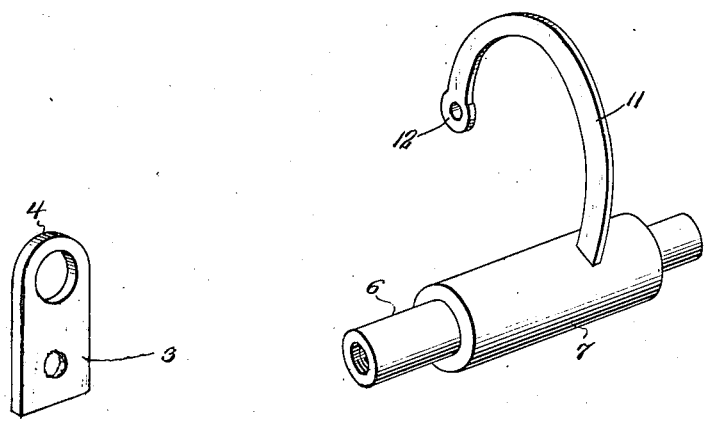
WITNESSES
INVENTOR
Choogas Zahrajian,
BY Victor J. Evans
ATTORNEY

UNITED STATES PATENT OFFICE.

GHOOGAS ZAHRAJIAN, OF SYRACUSE, NEW YORK.

PRESSURE-GAGE.

1,271,410.  Specification of Letters Patent.  Patented July 2, 1918.

Application filed July 18, 1917. Serial No. 181,360.

*To all whom it may concern:*

Be it known that I, GHOOGAS ZAHRAJIAN, citizen of Turkey, residing at Syracuse, in the county of Onondaga and State of New York, have invented new and useful Improvements in Pressure-Gages, of which the following is a specification.

This invention relates to measuring instruments, and more especially to pressure gages of the Bourdon type; and the object of the same is to simplify gages of this character now on the market, reduce the possible points where they may break or get out of order, and amplify the adjustments.

It is well known that Bourdon tube springs of the same lot, made at the same time, vary in stiffness; and in order to provide for proper calibration, means have been employed for permitting the adjustment of the point where the link is pivoted to the tube. Also means have been provided for eccentrically adjusting the throw of the crank carrying the index or hand. My invention possesses the equivalent of these adjustments without their defects and disadvantages, and in addition it possesses other adjustments so that the parts can be very accurately set with the hand standing exactly at zero when there is no pressure in the pipe being tested. Details are set forth in the following specification, reference being had to the drawings wherein:—

Figure 1 is a front elevation of my gage complete.

Fig. 2 is a similar elevation of the working parts, omitting the casing, crystal, and dial.

Figs. 3 and 4 are approximately central vertical sectional views through the casing, taken at right angles to each other.

Fig. 5 is a perspective view of a shaft and its arm.

Fig. 6 is a similar view of the bearing member.

Fig. 7 is a similar view of the link.

Fig. 8 is a detail view of a member of the casing.

No novelty is claimed for the cylindrical casing C whose front is closed by a crystal or glass G, nor for the dial D suitably inscribed and the hand H movable over the dial beneath the crystal as pressure in the system being tested increases. The nipple N is to be connected to the piping of the system which is to be tested, and the nipple is formed on a hollow block or base B whose interior communicates with a Bourdon tube spring S curved around within the casing behind the dial as usual. The increase of pressure admitted through the nipple to the spring causes the latter to expand or open slightly as well understood, and in gages of this character such movement of the free end of the spring is communicated to the hand which is caused to swing over the dial and indicate the increase of pressure in a manner well known in this art. In the drawings the spring S, base B and the nipple N are illustrated as constructed of a single member, but, it is to be understood that these parts are welded, or otherwise connected to provide a unitary structure and has been so illustrated.

Coming now to the details of the present invention, the base block B is provided at its rear side with an upstanding lug pierced with an opening which constitutes a bearing 1, and at its front side with a notch 2 in which is movably disposed a second lug 3 whose upper end has a second bearing 4, this lug being held in the notch by a screw 5 so that it is readily removable. In said bearings are mounted for oscillation the reduced ends 6 of a shaft 7 overlying the block as best seen in Fig. 2. Passing through an opening in the inner end of the hand H and engaging threads in a bore in the reduced end of the shaft 7 is a binding screw 9. The head of this screw contacting with the outer face of the hand H retains the same on the shaft. After withdrawing the hand therefrom, the screw 5 can be taken out and the lug 3 removed so that the shaft can be bodily taken out of place.

Between its bearings the shaft is pierced with a transverse hole 10, and fastened therein is one end of a flexible arm 11 which is by preference bent to approximately a semi-circle, its outer end having an eye 12. The numeral 13 designates a link which is of pliable metal bent into ogee shape, and having eyes 14 and 15 at its extremities. One of these is pivotally connected by a screw with the eye 12 at the outer end of the crank arm 11, and the other is pivotally connected by a screw with an eye formed in an extension 16 at the free end of the spring S. It will be obvious that by removing these screws the link can be taken out for substitution or repair, but accessibility to the parts is such that fine tweezers may be inserted to give this link a greater bend or to spread it out a little between the eyes at its extremities, so as to properly adjust the instrument. Also the long bent crank arm 11 may be opened out to decrease the throw of the crank, or bent so as to set its eye nearer to the shaft to increase the throw of the crank, and by properly bending this arm the instrument can be made to act earlier or later. In a word, all operative parts of the instrument are detachably connected and are readily accessible when the front portion of the crystal or casing is removed. The hand is adjustable on the shaft, the crank arm is adjustable as to its length or position with reference to the hand, and the link may be made longer or shorter; no stop is necessary to hold the hand at zero before pressure is admitted to the nipple, because the presence of the several adjustments permits so fine a setting of parts that the hand may be put at zero manually. This avoids an objection common in gages of this type, which is that where the hand rested against the stop it was apt to be bent or broken by the force of the spring, and also it avoids an effort or necessity to provide a stop with which other parts than the hand will co-act.

In the practical construction of this device the crystal G is mounted in a ring R which forms the front portion of the casing C and is removably connected therewith in any suitable manner. Also the casing is notched for the reception of the nipple N when the base block B is inserted in place, and screws or other fastening devices hold the block removably in the casing. The parts are by preference entirely of metal, nickeled or otherwise treated to present a neat appearance.

What is claimed as new is:

1. In a pressure gage of the type described including a hollow base block and nipple, a Bourdon tube spring, a dial, and a hand; a lug rising from the rear of the base block and having a bearing, a lug detachably connected with the front of the base block and having a bearing, a rock shaft having reduced ends journaled in said bearings, means for adjustably and detachably connecting the hand with the front end of the shaft, a bent crank arm projecting from the shaft between its bearings, an ogee link, and detachable pivots between its extremities and the crank arm and the free end of said spring.

2. In a pressure gage of the type described including a hollow base block and nipple, a Bourdon tube spring, a dial, and a hand; bearings on said base block, a rock shaft journaled in said bearings, said hand having an eye removably engaging the front end of the rock shaft, a set screw for holding the eye adjustably thereon, a crank arm projecting from the shaft between its bearings and bent nearly into a circle having an eye at its free end, an extension at the free end of the spring provided with an eye, and a link pivotally connecting said eyes.

In testimony whereof I affix my signature.

GHOOGAS ZAHRAJIAN.